Feb. 27, 1968   F. R. DAVENPORT ET AL  3,371,000
METHOD AND APPARATUS FOR MAKING INTEGRAL
MULTIPLE TOBACCO SMOKE FILTERS
Filed June 24, 1964  12 Sheets-Sheet 1
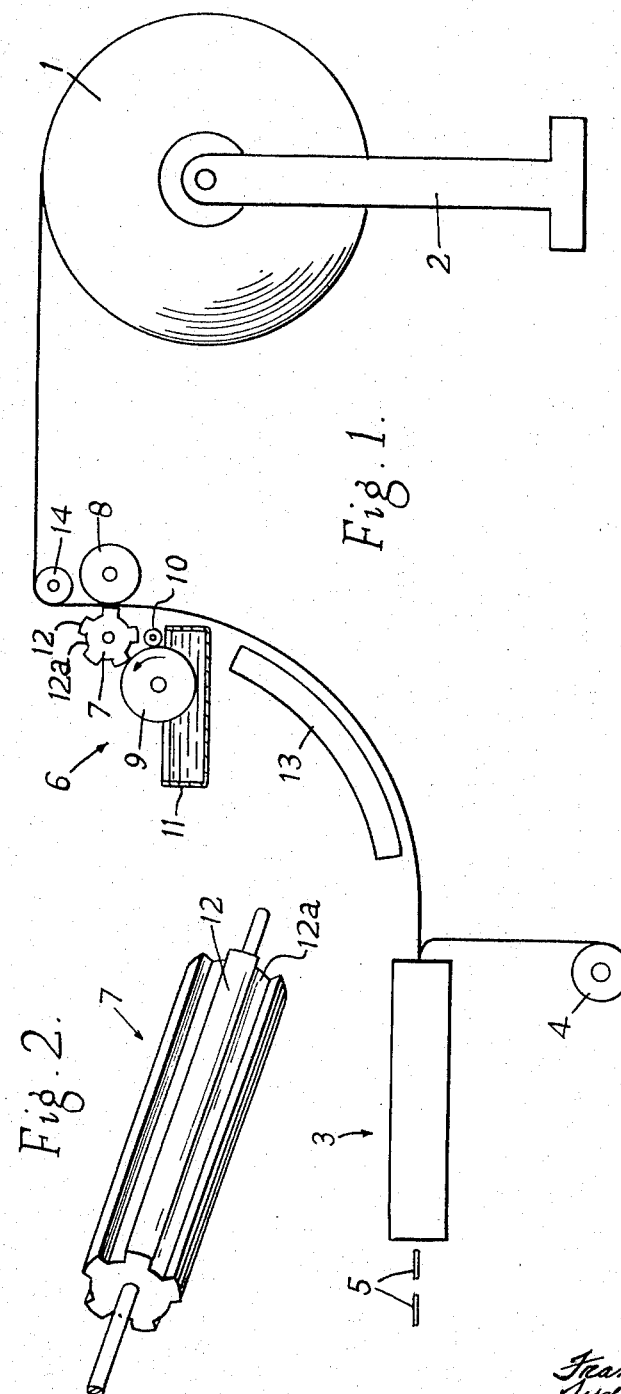
INVENTORS
Francis R. Davenport
Sydney Biback
By Brian Smith
Kemon, Palmer,
Stewart & Estabrook
ATTORNEYS

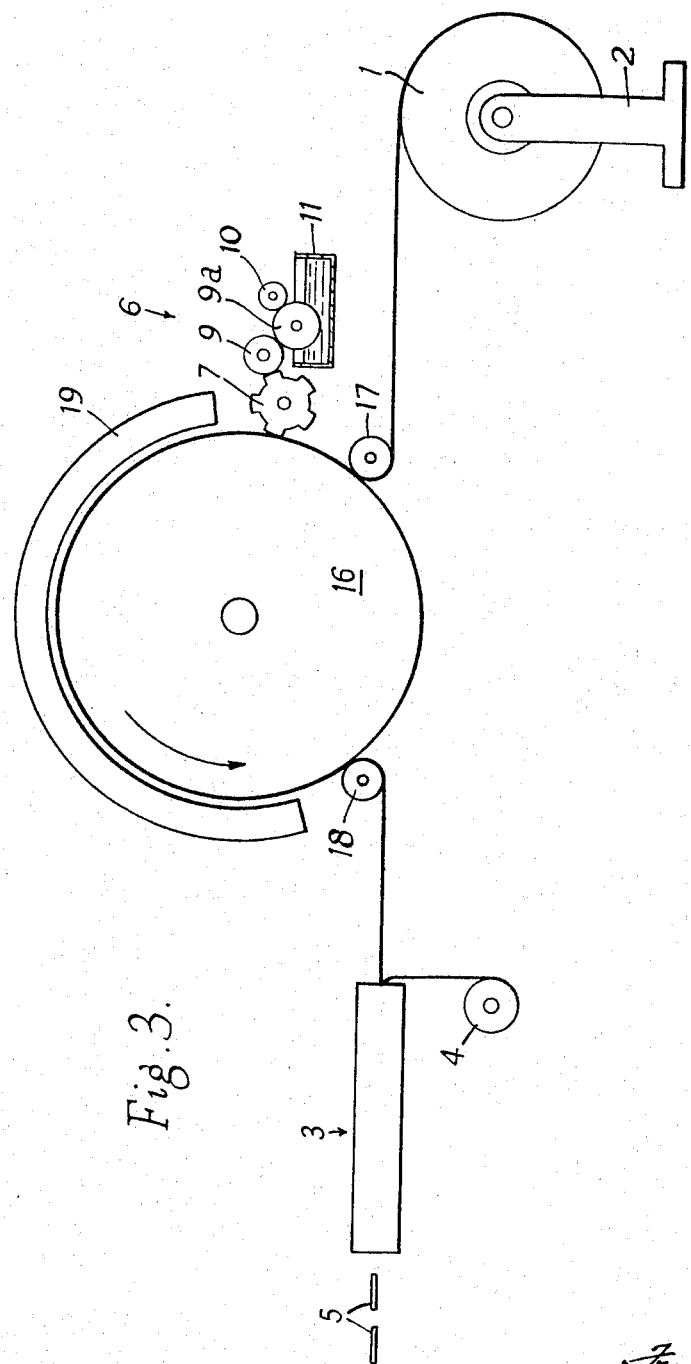

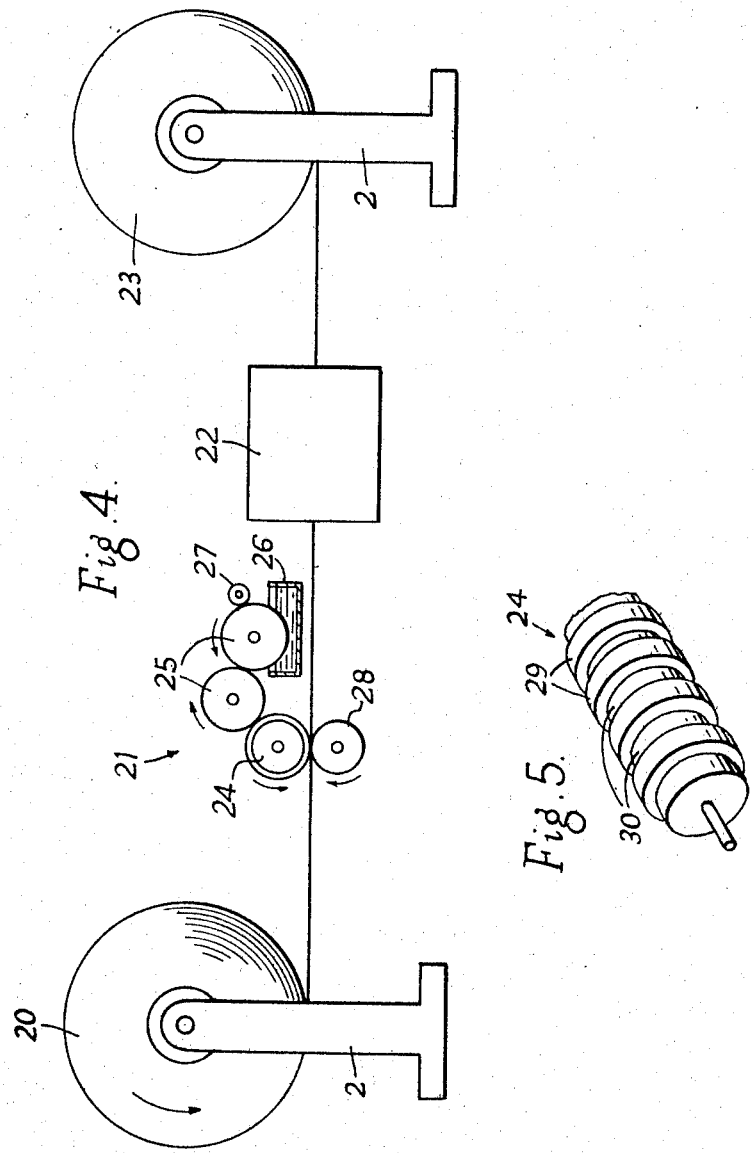

Feb. 27, 1968    F. R. DAVENPORT ET AL    3,371,000
METHOD AND APPARATUS FOR MAKING INTEGRAL
MULTIPLE TOBACCO SMOKE FILTERS
Filed June 24, 1964    12 Sheets-Sheet 4
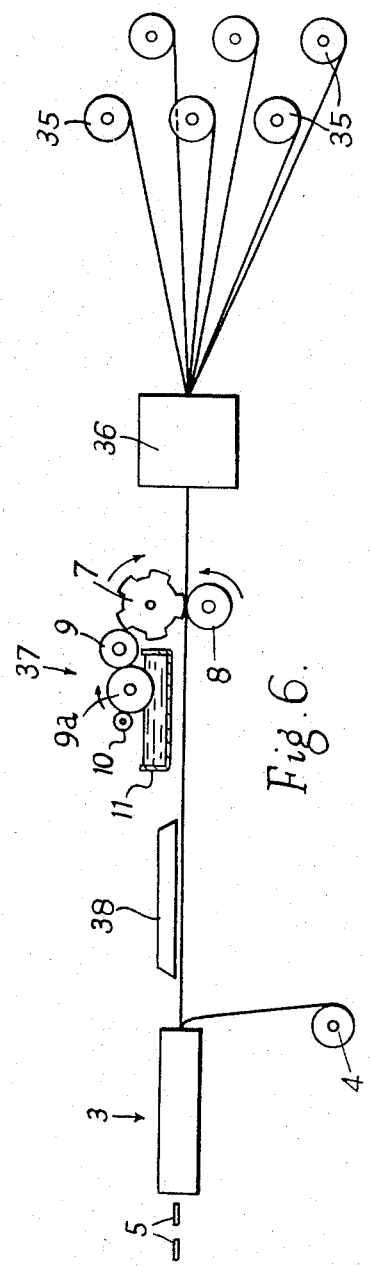
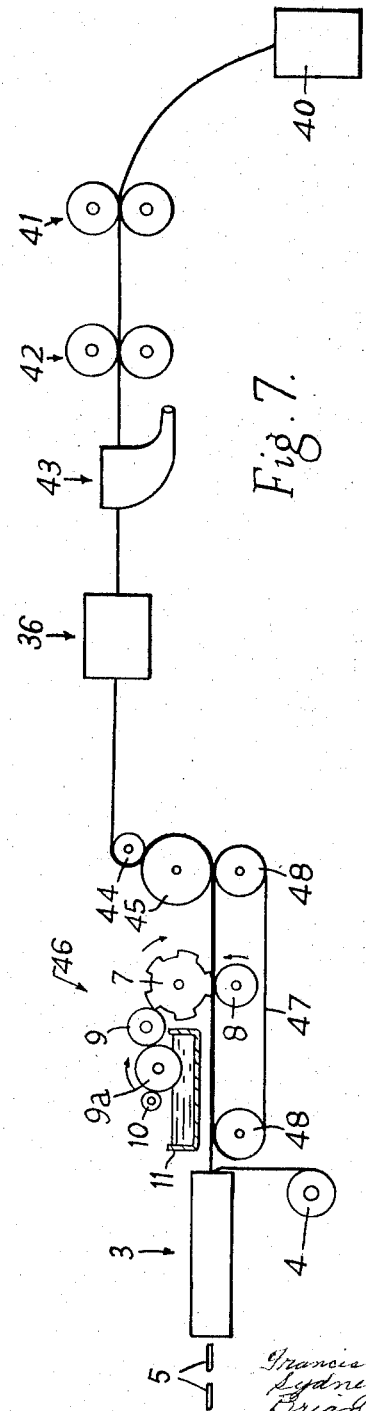
INVENTORS
Francis R Davenport
Sydney Ruback
Brian Smith
BY Kemon Palmer,
Stewart & Estabrook
ATTORNEYS

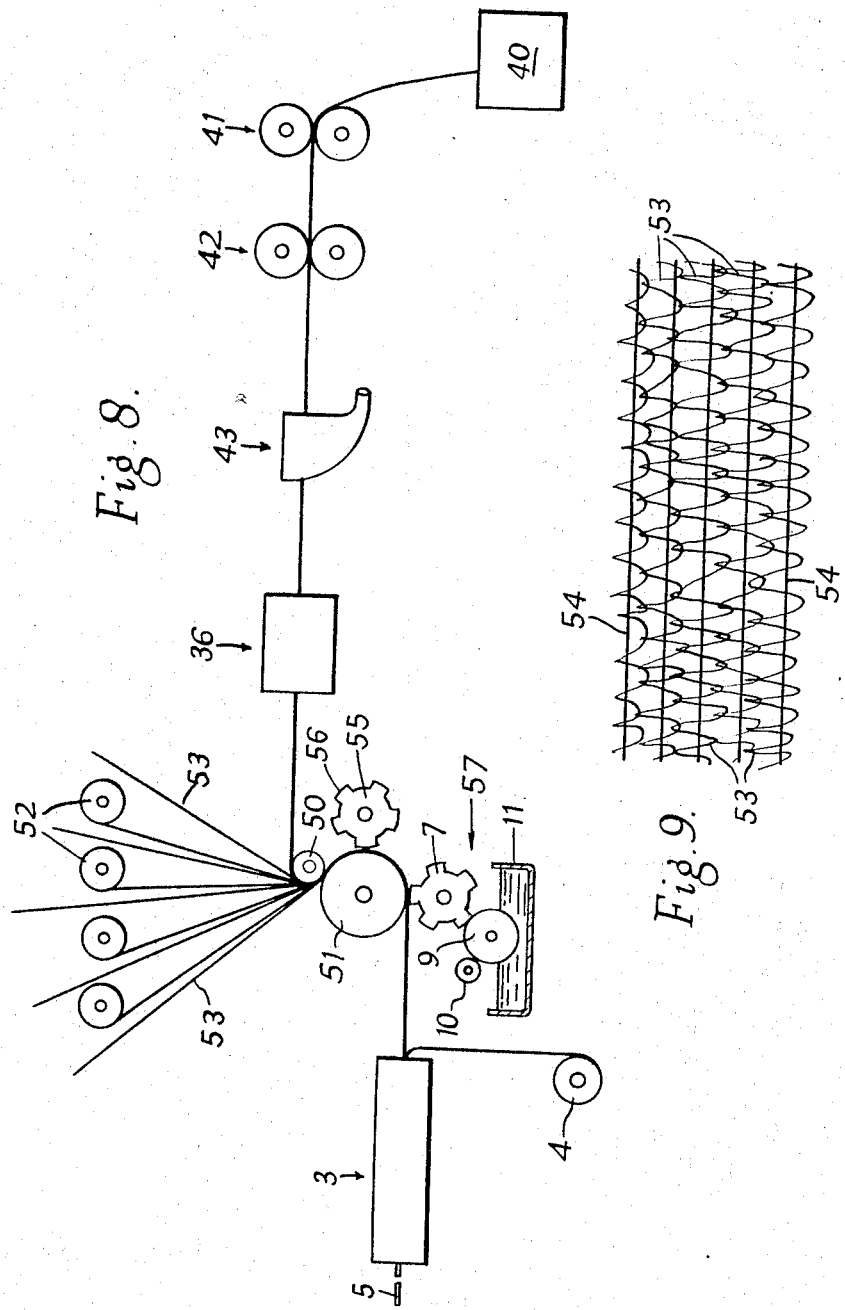

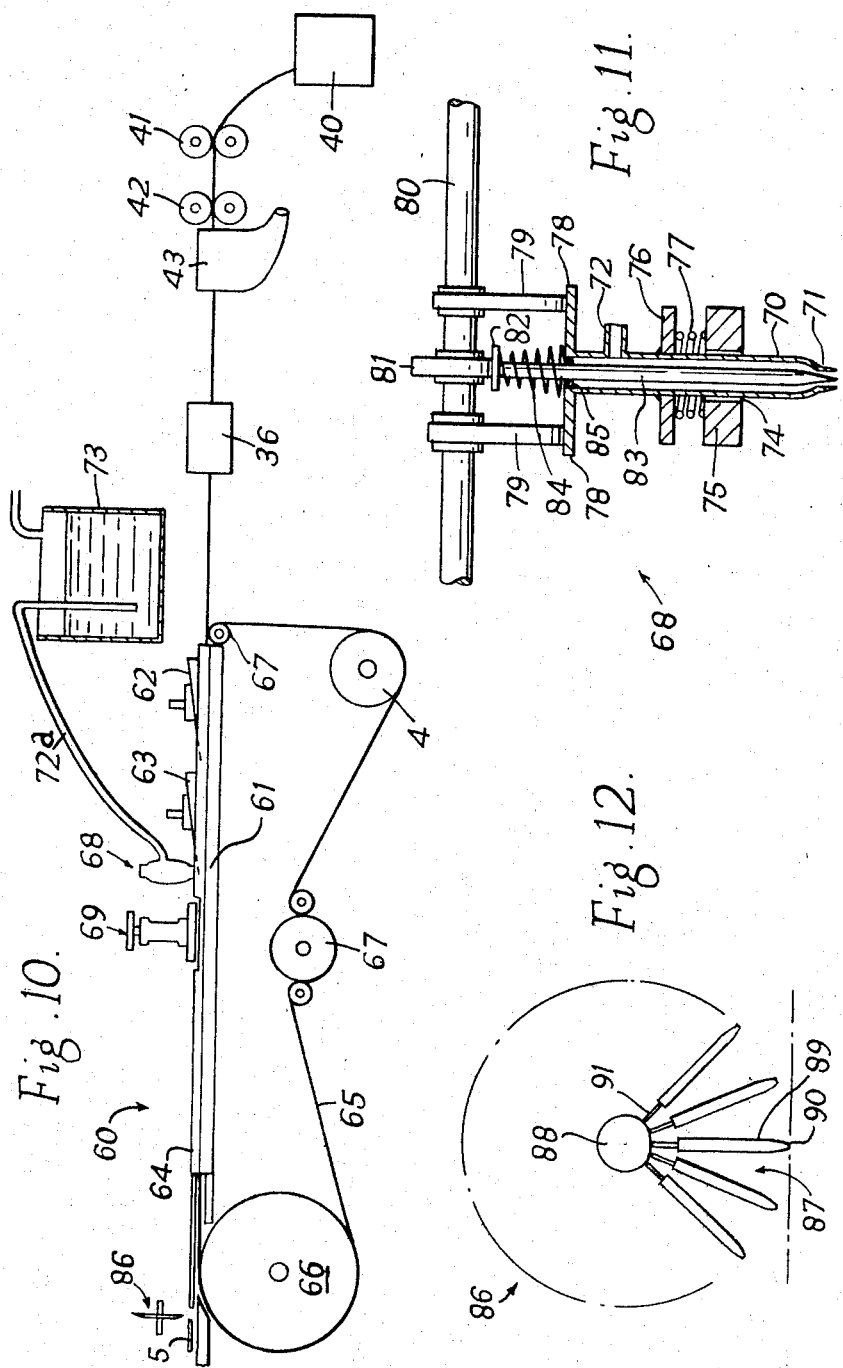

Feb. 27, 1968  F. R. DAVENPORT ETAL  3,371,000
METHOD AND APPARATUS FOR MAKING INTEGRAL
MULTIPLE TOBACCO SMOKE FILTERS
Filed June 24, 1964  12 Sheets-Sheet 7
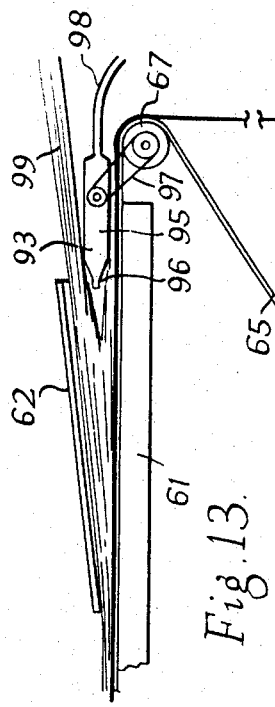
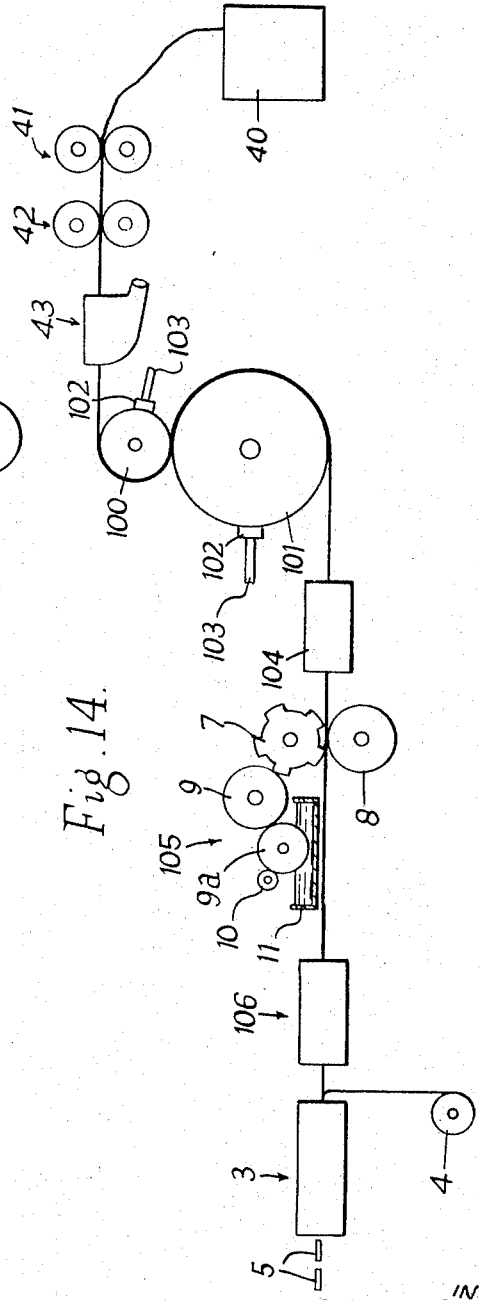
INVENTORS
Francis R. Davenport
Sydney Kuttick
By Brian Smith
Kenyon, Palmer,
Stewart & Estabrook
ATTORNEYS

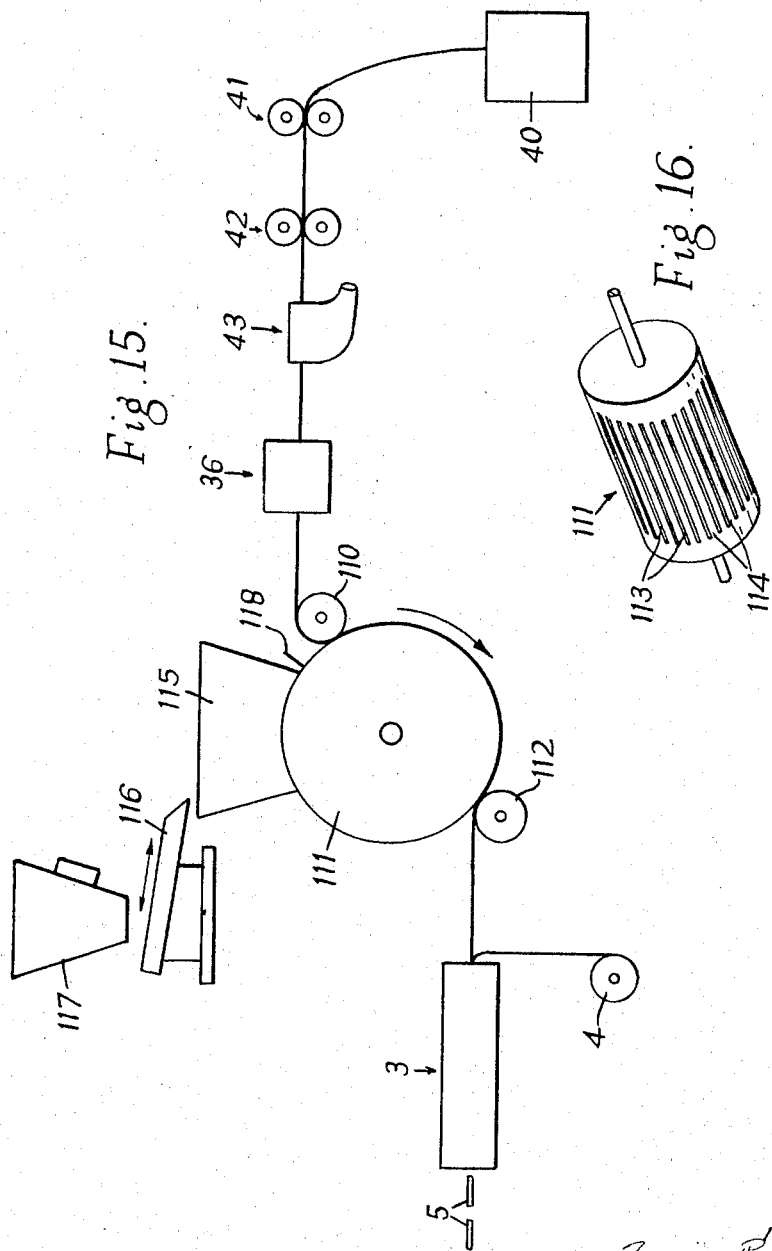

Feb. 27, 1968  F. R. DAVENPORT ET AL  3,371,000
METHOD AND APPARATUS FOR MAKING INTEGRAL
MULTIPLE TOBACCO SMOKE FILTERS
Filed June 24, 1964  12 Sheets-Sheet 9
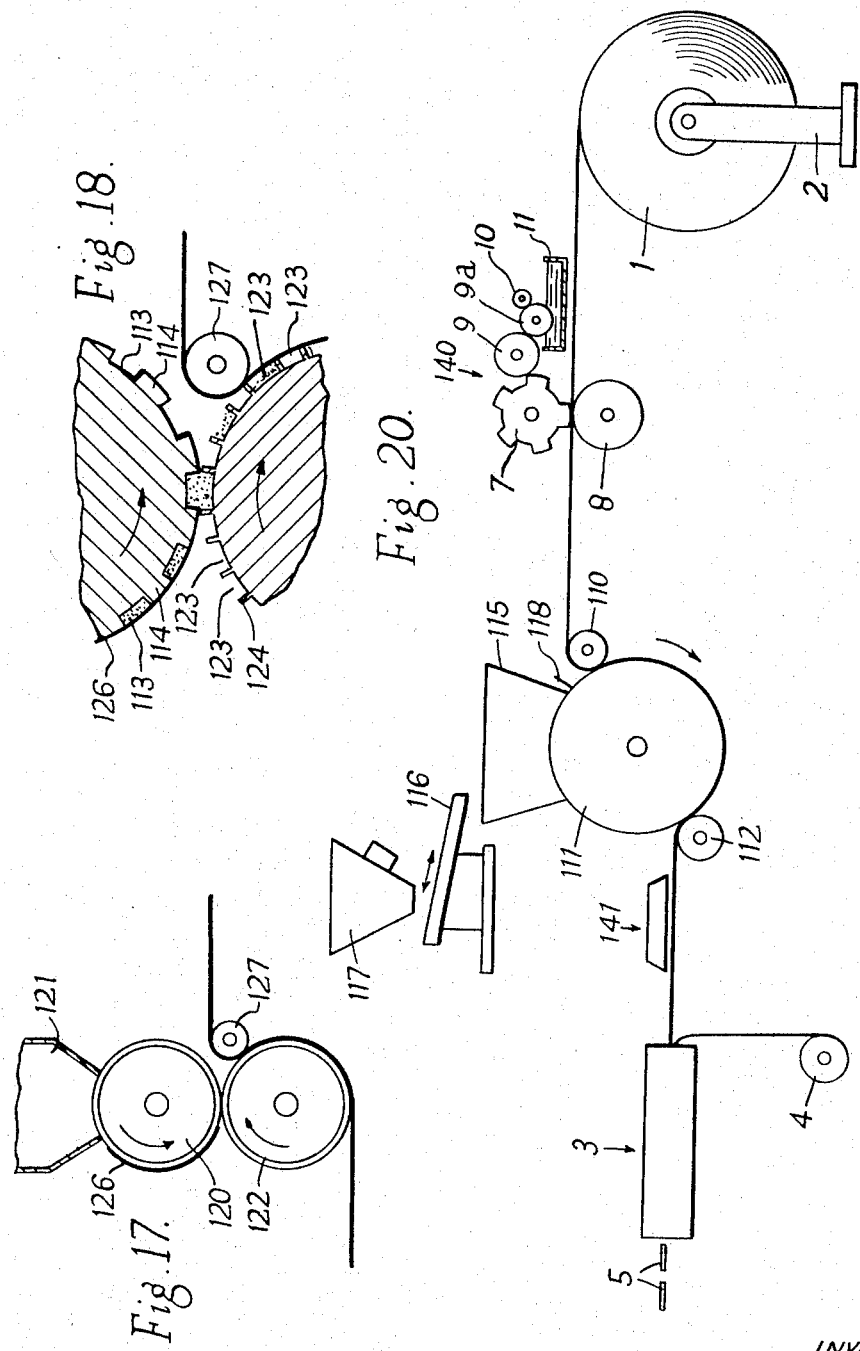
INVENTORS
Francis R. Davenport
Sidney Ruback
Breah Smyth
BY Kenon Palmer
Stewart & Estabrook
ATTORNEYS Feb. 27, 1968  F. R. DAVENPORT ETAL  3,371,000
METHOD AND APPARATUS FOR MAKING INTEGRAL
MULTIPLE TOBACCO SMOKE FILTERS
Filed June 24, 1964  12 Sheets-Sheet 10
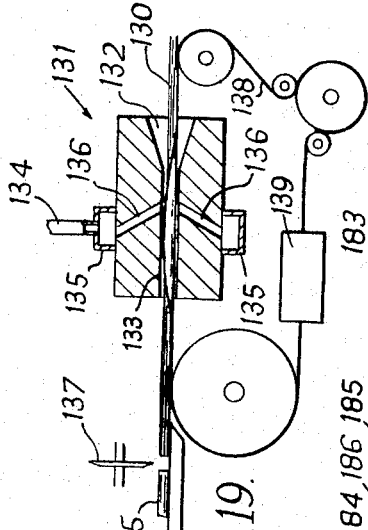
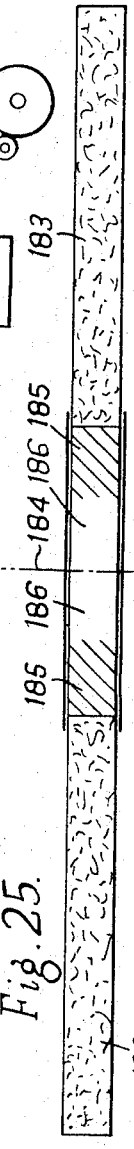
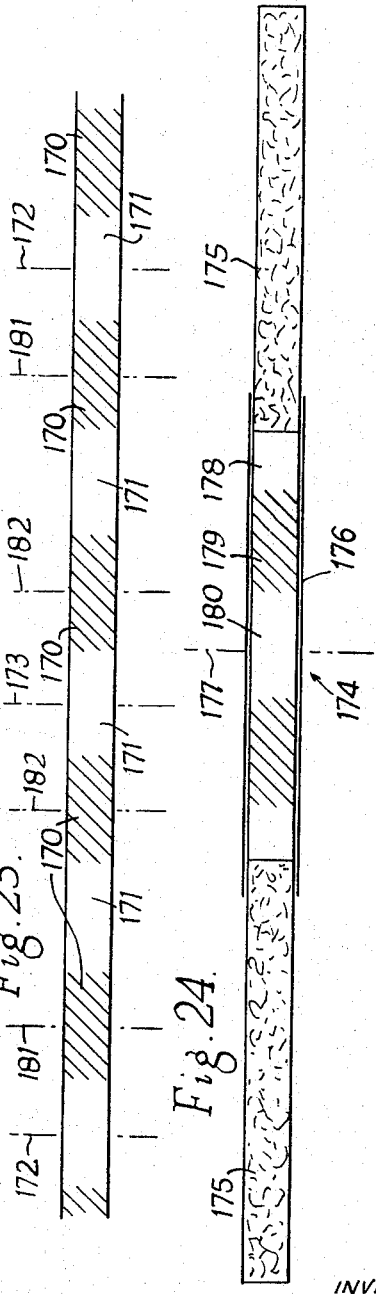
INVENTORS
Francis R. Davenport
Sydney Ryback
Brian Smith
BY Kenin Palmer
Stewart & Estabrook
ATTORNEYS Feb. 27, 1968    F. R. DAVENPORT ETAL    3,371,000
METHOD AND APPARATUS FOR MAKING INTEGRAL
MULTIPLE TOBACCO SMOKE FILTERS
Filed June 24, 1964    12 Sheets-Sheet 11
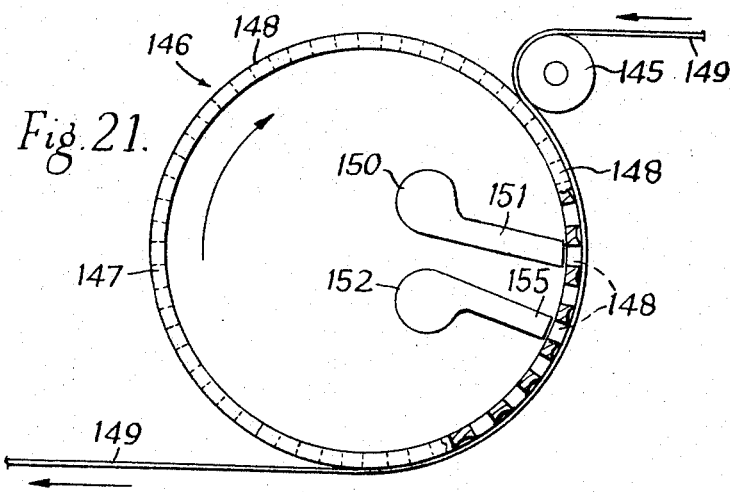
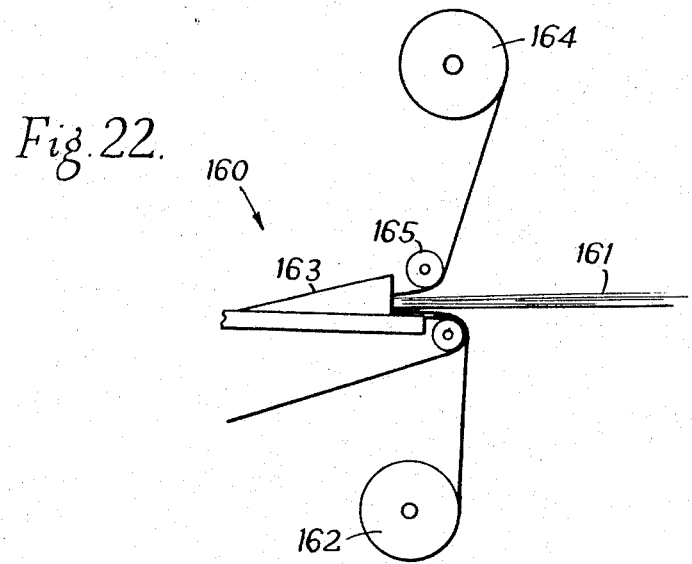
INVENTORS
Francis R. Davenport
Sydney Kubalk
Brian Smith
BY
Kenyon, Palmer,
Stewart & Estabrook
ATTORNEYS

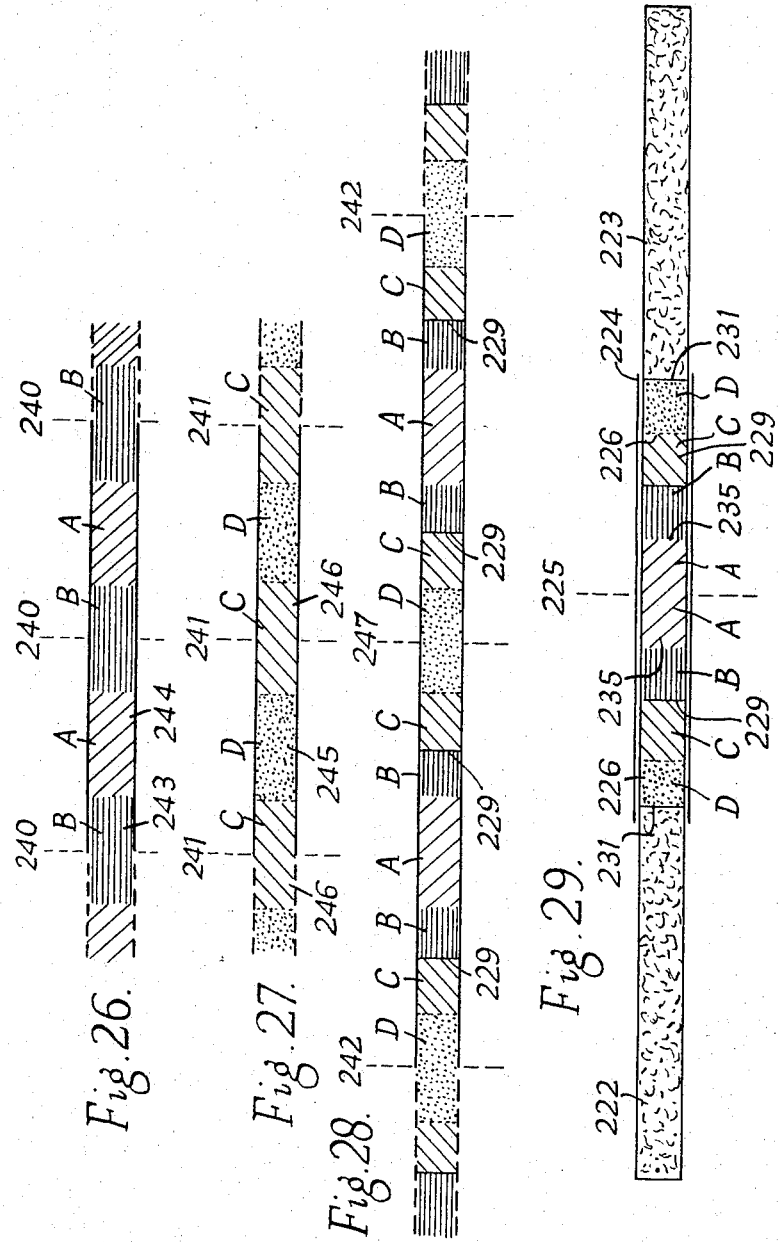

United States Patent Office 3,371,000
Patented Feb. 27, 1968

3,371,000
METHOD AND APPARATUS FOR MAKING INTEGRAL MULTIPLE TOBACCO SMOKE FILTERS
Francis Robert Davenport, Ashtead, Sydney Ruback, London, and Brian Smith, Aspley Heath, England, assignors to Cigarette Components Limited, London, England, a British company
Filed June 24, 1964, Ser. No. 377,570
Claims priority, application Great Britain, June 27, 1963, 25,661/63; Oct. 8, 1963, 39,681/63; Dec. 4, 1963, 47,963/63; Feb. 1, 1964, 5,356/64
11 Claims. (Cl. 156—180)

This invention relates to tobacco smoke filters and more particularly but not exclusively to a method of manufacturing tobacco smoke filters each comprising a section carrying an additional material capable of providing a required filtering or other effect upon tobacco smoke and unitary with a section without said material.

Filters having sections with differing characteristics are known in the art as multiple filters and cigarettes embodying such filters are known as multiple filter cigarettes.

A rod-like body comprising sections having differing characteristics and which when cut transverse to its axis forms a plurality of multiple filters will be termed in the ensuing description as a multiple length multiple filter.

Multiple filters are made at present by any of several methods all of which involve at some stage of the manufacture the handling of short rod-like bodies, in some cases as short as 7.5 mm., of differing compositions and co-ordinating and combining them in particular alternate and co-axial and endwise abutting relationship. The handling of such short bodies on high speed machinery incurs many difficulties which are known to result in undesired stoppages of the production machinery. In some cases wastage of tobacco is also incurred.

It is a purpose of this invention to overcome these difficulties by providing a method of manufacturing multiple filters which does not involve the handling and arranging of short rod-like bodies.

The present invention provides a method of manufacturing tobacco smoke filters, said method including the steps of feeding continuously an elongated web, tow or yarn, applying to the said web, tow or yarn an additional material capable of having a filtering or other required effect upon tobacco smoke, in particulate, liquid or suspended state and to separated zones on the web, tow or yarn, gathering, folding or bundling the said web, tow or yarn bearing said applied material into a rod-like body with the zones of the applied additional material being in axially separated sections of the rod-like body and cutting the rod-like body into filters or multiple length filter rods by transverse cuts.

The invention will now be described by way of example with reference to the accompanying diagrammatic drawings in which:

FIGURE 1 shows a form of apparatus for carrying into effect the method of the present invention by applying zones of additional material to a web of paper, FIGURE 2 is a perspective view of a portion of the apparatus shown in FIGURE 1, FIGURE 3 shows an apparatus alternative to that shown in FIGURE 1, FIGURE 4 shows an apparatus for applying zones of an additional material to a web of crepe paper, FIGURE 5 is a view of a portion of the apparatus shown in FIGURE 4, FIGURE 6 shows a form of apparatus for applying zones of an additional material to a plurality of bulked yarns, FIGURE 7 shows a form of apparatus for applying zones of an additional matetrial to a continuous filamentary tow, FIGURE 8 shows an arrangement alternative to that in FIGURE 7, FIGURE 9 shows a portion of a spread band of filaments at a stage in the process performed with the apparatus of FIGURE 8, FIGURE 10 shows an apparatus alternative to that in FIGURE 7 or FIGURE 8, FIGURE 11 shows in section a portion of the apparatus shown in FIGURE 10 on an enlarged scale, FIGURE 12 shows an apparatus alternative to that portion of the apparatus of FIGURE 10 shown in FIGURE 11, FIGURE 13 shows a modified portion of an apparatus otherwise as shown in FIGURE 10, FIGURE 14 shows a further form of apparatus for applying zones of an additional material to a continuous filamentary tow, FIGURE 15 shows a further form of apparatus for applying zones of an additional material to a continuous filamentary tow, FIGURE 16 is an enlarged perspective view of a portion of the apparatus shown in FIGURE 15, FIGURE 17 shows an apparatus alternative to a portion of the apparatus shown in FIGURE 15, FIGURE 18 is an enlarged view in cross-section of a portion of the apparatus shown in FIGURE 17, FIGURE 19 shows a plugmaker which may be used in place of the plugmaker shown in FIGURE 15, FIGURE 20 shows a further form of apparatus for applying zones of an additional material to a web of paper, FIGURE 21 shows an arrangement which may be substituted for portions of the apparatus shown in FIGURE 14, FIGURE 22 shows a modification which may be applied especially to any of the apparatuses shown in FIGURES 6, 7, 8 and 14, FIGURE 23 shows schematically a portion of a continuous rod made by the method of the present invention, FIGURE 24 shows schematically a dual length dual filter cut from the rod shown in FIGURE 23 and located between and joined to two tobacco rods, FIGURE 25 shows schematically another form of dual length dual filter cut from the rod shown in FIGURE 23 and located between and joined to two tobacco rods, FIGURE 26 shows a portion of a first continuous dual filter rod made by the method of the present invention, FIGURE 27 shows a portion of a second continuous dual filter rod made by the method of the present invention, FIGURE 28 shows a portion of a continuous quadruple filter rod formed from cut portions of the rods shown in FIGURES 26 and 27, FIGURE 29 shows a dual length quadruple filter, cut from the continuous rod shown in FIGURE 28 and located between two tobacco rods.

Throughout the ensuing description similar components shown in different figures of the drawings will be designated by the same reference numerals in each figure.

FIGURE 1 shows an apparatus for manufacturing multiple length multiple filters in which paper forms what may be termed the carrier material. The paper may have grooves extending in known manner in a direction longitudinally of the continuous web. The paper, which may be, for example, 200 mm. wide is supplied from a roll 1 supported on a stand 2 and is led to a plugmaker 3 which may be of conventional form and wherein the paper is gathered and enwrapped in known manner with wrapper material supplied from a roll 4 and from which multiple length filter rods 5 issue having been cut off the continuous rod-like body formed in the plugmaker 3.

Intermediate the roll 1 and the plugmaker 3 is a device, generally indicated by the reference numeral 6, for applying zones, in the present case stripes, of, for example, a slurry of carbon on the paper.

The device 6 comprises an applicator roller 7, a pressure roll 8, a fountain roll 9, a doctor roll 10 and a trough 11. The trough 11 contains slurry to be applied to the paper. The fountain roll 9 dips into the slurry in the trough 11 at its lowest part and is in surface contact with the applicator roller 7. The doctor roll 10 is so disposed as to doctor, or meter, the amount of slurry carried round by the roll 9 to be transferred to the applicator roller 7.

The applicator roller 7, as may also be seen in FIGURE 2, comprises a plurality of surfaces 12 separated from one another by axially directed valleys 12a. The surfaces 12 conform to an imaginary cylinder coaxial with the roller 7. Each surface 12 may have an arcuate length of, for example, 15 mm. and the surfaces 12 may be separated one from another by an arcuate length of 15 mm. The pressure roll 8 serves to press the paper into contact with the surfaces 12.

Between the device 6 and the plugmaker 3 there is located an infra-red heater 13 directed at the paper.

A roller 14 is provided above the device 6 so that paper is led to the device 6 in a direction which does not vary upon change in diameter of the roll 1.

In operation, paper is drawn off the roll 1 by the co-operating engagement of the applicator roller 7 and the pressure roll 8 which are driven for rotation as is the fountain roll 9. On passing between the roller 7 and the pressure roll 8 the paper has applied thereto stripes of slurry carried on the surfaces 12 of the roller 7. Since the axis of the roller 7 is parallel to the width of the paper the stripes have boundaries normal to the longitudinal axis of the paper. The stripes extend throughout the full width of the paper and have a dimension in the longitudinal direction of the paper equal to the arcuate length of the surfaces 12, that is, in the present case 15 mm. and adjacent stripes are spaced apart by a distance of 15 mm.

It is arranged that between the device 6 and the plugmaker 3 the paper with stripes thereon follows a generally arcuate path. Whilst moving over this arcuate path the paper passes close to the heater 13 which serves to drive off the suspending medium of the slurry forming the stripes. The dried paper is drawn forward into the plugmaker 3 wherein it is gathered into rod-like form, is enwrapped in wrapper material from the roll 4 and is cut into multiple length multiple filters 5 which are subsequently delivered to a cigarette making machine.

FIGURE 3 shows an alternative arrangement for applying to a web of paper, zones of an additional material capable of having a filtering or other required effect upon tobacco smoke. In this arrangement paper is led off the roll 1 and is caused to pass in surface contact over the greater portion of the peripheral surface of a drum 16 by means of two rollers 17 and 18 nipping the paper between themselves and the drum 16. In this arrangement the roller 7 is so disposed that it applies stripes to the paper whilst the paper is on the drum 16. The applicator device 6 includes in this case a further fountain roll 9a and the pressure roll 8 of the arrangement shown in FIGURE 1 is omitted since its purpose is performed by the drum 16. A hood 19 overlies the portion of the drum 16, and hence the paper, between the device 6 and the roller 18 at which the paper leaves the drum 16. The hood 19 is provided with conduits leading to a source (not shown) of hot air.

The drum 16 is driven for rotation, in a counterclockwise direction as seen in FIGURE 3, at a peripheral speed equal to or approximately equal to and dependent on the linear speed of operation of the plugmaker 3.

The drum 16 draws the paper off the roll 1. The paper passes through the nip of the roll 17 and drum 16 and then passes the device 6. The applicator roller 7 is driven for rotation so that its peripheral velocity is equal to the peripheral velocity of the drum 16. The roller 7 applies to the paper, stripes of slurry, the stripes having the form as described with respect to FIGURE 1. Upon passing away from the device 6 the paper passes beneath the hood 19 and hot air is directed on to the paper and dries the paper which became wetted by the suspending medium of the slurry forming the stripes. After passing between the nip of the drum 16 and the roller 18 the paper passes to the plugmaker 3 wherein it is gathered, enwrapped and cut into multiple length multiple filter rods 5.

FIGURE 4 shows an arrangement for applying to crepe paper zones, in the present case stripes, of an additional material capable of having a filtering or other required effect upon tobacco smoke. Since in crepe paper the axes of the corrugations therein extend in parallel directions normal to the length of the web of paper on a roll and since in tobacco smoke filters it is desirable that the axes of the corrugations extend in the axial direction of the filter, it is necessary that the continuous web of crepe paper from a roll be cut into strips and that these strips be aligned with those margins of the strips which were previously the side margins of the web being in abutting or slightly overlapping relationship and that the strips be led successively in this alignment to a plugmaker wherein they are gathered into rod form and wrapped. In this way the axes of the corrugations are directed axially of the filters produced. A plugmaking machine for manufacturing tobacco smoke filters from crepe paper is described in United Kingdom patent specification No. 462,546.

In the arrangement shown in FIGURE 4 crepe paper from a roll 20 passes through a device 21 for applying zones of additional material and a drier 22 and is reeled up on a roll 23. The device 21 includes an applicator roller 24, a fountain roll 25 dipping into a trough 26 of additional material to be applied to the paper, a doctor roll 27 for metering the amount of material fed off the roll 25 on to the roller 24 and a pressure roller 28 serving to press the paper into contact with the roller 24.

The roller 24 is different to the roller 7 as may be seen in FIGURE 5 and is formed by a plurality of cylindrical surfaces 29 separated from one another by circumferentially directed valleys 30. The surfaces 29 may have a dimension in the axial direction of, for example, 15 mm. and may be separated one from another by a distance of 15 mm.

The roller 24 and the pressure roller 28 are driven for rotation with the same peripheral speed.

In operation, the web of crepe paper is continuously drawn off the roll 20 by the co-operation of the roller 24 and the pressure roller 28. Material in the trough, for example an aqueous slurry of finely divided activated charcoal, is transferred from the fountain roll 25 which is caused to rotate, to the surfaces 29 of the roller 24. The material is then transferred to the paper and appears thereon in the form of continuous stripes having their axes parallel to the side edges of the web of paper. The paper then passes through the drier 22 in which radiant heat or hot air is directed on to the paper and dries out the paper which became wetted by the suspending agent of the slurry. Upon leaving the drier 22, the paper is reeled up on the roll 24 which is driven for rotation through a friction clutch so that the paper is held taut but is not dragged past the printing roller 24.

The paper in the roll 23 with continuous stripes of material thereon is subsequently used as the starting web in a machine for making filter plugs from crepe paper. In this machine the axis of the roll 23 is disposed parallel to the axis of ultimate movement of the paper through the plugmaker of the machine. The paper is led off the roll 23 and stripes are successively cut off, the line of the cut being normal to the side edges of the web of paper, that is normal to the longitudinal axes of the continuous stripes thereon. The distance between successive cuts is determined by the characteristics required of the filters being formed. The cut strips are led successively forward into alignment with the axis of the plugmaker and thence along the axis of the plugmaker where they are gathered, enwrapped with paper and cut into lengths.

Instead of a single roll 23 being used as the starting web in the filter plug making machine, three rolls 23 may be used at the same time, the webs being brought into overlying relationship. It is arranged by means of photo-electric control devices that the stripes of material in each strip of paper are exactly in register with stripes on the other two strips and are in register with the cut-off of the plugmaker.

The crepe paper on the roll 20 may, for example, be 722 mm. wide. The strips cut off the paper have a dimension in the direction of the longitudinal axis of the web of paper of 32 mm. It is arranged that each strip overlaps adjacent preceding and succeeding strips by 1 mm. when aligned for movement towards the plugmaker.

It will be realised that since the longitudinal axis of the contiuous stripes of slurry applied to the continuous web of paper from the roll 20 are parallel to the side edges of the web of paper and since the side edges of the web become leading and trailing end edges of the strips, the stripes on the strips have boundaries normal to the direction of movement of the cut strips through the plugmaker.

It will also be realised that by reeling up the web for subsequent use, the application of the zones may be performed at a speed convenient to that process and the manufacture of filter rods from that web of paper may be performed at a speed convenient to that process. However the zones may be applied to the web as it is being fed to the plugmaking machine.

It is arranged that the portions of the continuous rod containing the overlapping portions of the sheets or strips are cut out and discarded.

The arrangement shown in FIGURE 6 may be used for manufacturing multiple length multiple filter rods embodying filamentary material rather than paper as in the above-described arangements. Shown in FIGURE 6 are a plurality of reels 35 of bulked yarn. This yarn is composed of a plurality of continuous filaments all or most of which are convoluted individually into coils, loops or whorls at random intervals along their lengths and all of which are bundled together so as to form a relatively nonextensible yarn core provided externally with a multitude of ring-like loops irregularly spaced along the yarn surface.

Also shown in FIGURE 6 are a spray booth 36, an applicator device 37 substantially the same as the applicator device 6 described with respect to FIGURE 1, a drier 38, a plugmaker 3 and a reel of wrapper material 4. The yarns are led simultaneously from their reels 35 and in side by side relationship through the spray booth 36 wherein a plasticiser for the material of the yarns is sprayed on to the filaments of the yarns. The yarns are then led in side by side relationship through the nip of the pressure roll 8 and the applicator roller 7 of the device 37. The roller 7 of the device 37 applies stripes of additional material to the yarns in a manner as described above with reference to FIGURES 1, 2 and 3. The stripes have boundaries normal to the overall longitudinal axes of the yarns. After having material applied thereto the yarns pass beneath the drier 38 which directs radiant heat on to the yarns and vapourises the suspending agent of the material forming the stripes. The yarns pass to the plugmaker 3 wherein they are gathered and enwrapped and from which issue multiple length multiple filters 5.

The roller 7 and the pressure roll 8 are driven for rotation at a peripheral speed substantially equal to the linear speed of movement of the yarns and wrapper through the plugmaker 3.

The arrangement shown in FIGURE 7 is for applying zones of additional material to a continuous filamentary cellulose acetate tow. Such a tow is extensible when subjected to tension. Therefore, means are provided for substantially preventing extension or contraction of the tow in an axial direction after additional material has been applied thereto in zones, in order to prevent a portion of the tow bearing additional material moving in an axial direction relatively to an adjacent portion also bearing material.

The arrangement shown in FIGURE 7 comprises a bale 40 of tow, a first pair of rollers 41, a second pair of rollers 42, a banding jet 43, a spray booth 36, a pair of rollers 44 and 45, an applicator device 46, an endless belt 47 entrained about two rollers 48, a plugmaker 3 and a roll of wrapper material 4.

The tow is drawn out of the bale 40 by the rollers 41 which are driven for rotation at a peripheral speed less than that of the rollers 42 so that the tow is tensioned and bloomed intermediate the two pairs of rollers 41 and 42 in known manner. After passing between the rollers 42 the tow is allowed to relax, that is its linear speed is allowed to decrease to approximately the peripheral speed of the first pair of rollers 41. The bloomed tow next passes through the banding jet 43 wherein, in a known manner, air is blown into the tow to spread the filaments into a band of substantially uniform width. The banded tow next passes through the spray booth 36 wherein plasticiser, for example triacetin, for the cellulose acetate of the filaments is sprayed on to the filaments. Upon leaving the spray booth 36 the tow passes over the roller 44 and through the nip of the rollers 44 and 45.

At the lower extremity of the roller 45 the tow passes on to the upper run of the endless belt 47 which is in contact with the lower extremity of the roller 45. The belt 47 supports the tow in its passage to the plugmaker 3 and prevents it being stretched either by gravity or by being drawn over a stationary surface.

The applicator device 46, which is substantially the same as the applicator device 37 of FIGURE 6 is located above the belt 47 and the pressure roll 8 is located between the two runs of the belt 47 and in contact with the underside of the upper run.

The roller 45, the roller 7 and the roller 44 are driven for rotation with the same peripheral speed which is equal to the linear speed of movement of the belt 47 and the speed of movement of the tow and wrapping material from the roll 4 through the plugmaker 3.

The arrangement shown in FIGURE 8 is an alternative to that shown in FIGURE 7 and is for applying zones, in this case stripes, of additional material to a continuous filamentary cellulose acetate tow.

In this arrangement instead of carrying the tow from the applicator device to the plugmaker 3 on an endless belt 47, continuous inextensible yarns are welded to the tow when in band form and prior to having the zones of additional material applied thereto. The inextensible yarns prevent the tow extending after leaving the applicator device and before being gathered in the plugmaker 3.

The tow is tensioned and bloomed, banded and sprayed with plasticiser as described, with reference to FIGURE 7. After leaving the spray booth 36 the banded tow passes through the nip of a pair of rollers 50 and 51. A plurality, for example 40, inextensible yarns from reels 52 are also fed through the nip of the rollers 50 and 51 and are disposed uniformly across the band of tow. FIGURE 9 is an enlarged view of a portion of the band of tow with the filaments 53 thereof partially overlying one another and with the inextensible yarns 54 uniformly spaced across the band.

The tow and yarns 54 are carried round a portion of the surface of the roller 51 which serves to press the tow and yarns into engagement with a heated or welding roller 55 of similar form to that of the applicator rollers 7 previously described. The heated roller 55 has raised surfaces 56 which are grooved and which serve to weld the yarns 54 to the filaments 53 wherever they are in contact with one another. With the filaments 53 now welded to the yarns 54, the filaments are substantially prevented from extending when subjected to such tensile forces as may be encountered upon proceeding through the remainder of the apparatus.

Whilst still in contact with the roller 51 the tow and yarns pass in contact with the applicator roller 7 of an applicator device 57 substantially similar to the applicator device 46 of FIGURE 7. After having zones, in this case stripes, of additional material applied thereto the yarns and tow are drawn forward to the plugmaker 3.

The rollers 50 and 51, the welding roller 55 and the roller 7 are driven for rotation with a peripheral speed substantially equal to the linear speed of movement of the tow and yarns and the wrapper through the plugmaker 3.

The arrangement shown in FIGURE 10 also may be used for applying zones of additional material to an extensible tow of filamentary material.

In the arrangement shown in FIGURE 10 the tow is tensioned and bloomed, banded and sprayed with plasticiser as described with reference to FIGURES 7 and 8. The tow is then led to a plugmaker generally indicated by the reference numeral 60 which is basically of known form and has mounted thereon a garniture 61 including two tongue-pieces 62 and 63, a folder 64 aligned with the common axis of the tongue pieces 62 and 63, and an endless belt 65 running beneath the tongue pieces 62 and 63 and through the folder 64 and entrained about the tape drum 66 and the rollers 67. A reciprocating applicator 68 and a paste applicator 69 are mounted between the second tongue-piece 63 and the folder 64. The tow and wrapping material from the roll 4 are drawn forward to and through the plugmaker 60 by gripping engagement with the belt 65. The tow is gathered into rod-like form as it passes beneath the tongue-pieces 62 and 63 and simultaneously the wrapper is caused partially to enwrap the gathered rod. The upper surface of the gathered rod of tow intermediate the end of the second tongue piece and the beginning of the folder 64 is exposed.

The reciprocating applicator 68 as may be seen in FIGURE 11 comprises a tubular body 70 having a nozzle 71 at its lower end and a connection 72 joined to a flexible supply conduit 72a leading from a reservoir as may be seen in FIGURE 10. The body 70 can reciprocate in a vertical direction through an aperture 74 in a fixed guide 75 mounted on the garniture 61 of the plugmaker 60. An annular flange 76 is provided on the body 70 and a coil spring 77 bearing against the upper surface of the guide 75 and the under surface of the flange 76 serves to bias the applicator body 70 in an upward direction away from the gathered tow. At its end remote from the nozzle 71, the applicator body 70 is provided with a cam follower 78 bearing against a pair of first cams 79 mounted on a shaft 80 geared to the means driving the roller 66 driving the belt 65. The shaft 80 is provided with a second cam 81 mounted between the cams 79 and bearing against a cam follower 82 provided on the upper end of a needle 83 extending axially through the applicator body 70 towards the nozzle 71. The needle 83 is biased by a spring 84 in an upward direction so that the cam follower 82 bears on the cam 81.

The needle 83 is a sliding fit within a seal 85 provided at the upper end of the applicator body 70. Upon rotation of the shaft 80 the cams 79 cause the applicator body to reciprocate up and down. The formation of the cams 79 and 81 and the general arrangement is such that the lower extremity of the needle 83 blocks the nozzle 71 except when the nozzle 71 is within the tow at which time the needle 83 moves out of the nozzle 71 allowing a quantity of a slurry of additional material, supplied from the reservoir 73 through the conduit 72 to the interior of the body 70, to flow out of the nozzle 71 into the tow, for example, at 30 mm. intervals.

After passing the applicator 68, paste is applied by the paste applicator 69 in known manner to an upstanding margin of the wrapper and the wrapper is then folded into a cylinder about the gathered rod-like tow and is sealed to itself. The continuously formed enwrapped rod-like body is cut by means of a knife 86 into multiple length multiple filters 5.

As the use of an aqueous suspending agent in the slurry applied to the tow may cause wetting of a wrapper formed of paper it is sometimes desirable to use a coated paper such as polyethylene coated paper for the wrapper material. In this case instead of applying adhesive for sealing the longitudinal margins of the paper wrapper material, the longitudinal margins may be heat-sealed.

It will be realised that the quantities of slurry injected into the tow spread within the tow in both axial and radial directions. The extent of the spreading may be governed by the appropriate selection of characterisics of the slurry. If quantities of slurry are injected at 30 mm. intervals it may be arranged that slurry spreads axially in both directions away from the injection point for a distance of approximately 7 mm. In this case there are approximately equal lengths of slurry-bearing and slurry-free sections of the rod arranged alternately.

Instead of the reciprocatory applicator 68 described above, a rotary applicator 86 as diagrammatically shown in FIGURE 12 may be employed. The rotary applicator 86 comprises a plurality of injectors 87 uniformly angularly disposed about a common axis which is also the axis of rotation of the rotary applicator and directed radially of the axis. Each injector 87 comprises a hollow body 89 having a nozzle 90 at its end remote from the axis of rotation. A needle 91, similar to the needle 83 shown in FIGURE 11 extends through the body 89 towards the nozzle 90. The end of the needle 91 remote from the nozzle 90 bears on a stationary cam 88 at the axis of rotation of the applicator 86.

The rotary applicator 86 is disposed above the exposed portion of the tow between the second tongue piece 63 and the folder 64 with the axis of rotation normal to the vertical plane containing the longitudinal axis of the gathered rod-like tow. The applicator 86 is driven for rotation and the arrangement is such that the peripheral speed of the nozzles 90 is equal to the linear speed of the tow through the plugmaker 60 and also the axis is so spaced above the plugmaker 60 that a nozzle extends into the tow when it is at the lowest extremity of the rotary motion.

The form of the cam is such that the nozzle 90 of each injector 87 is closed by its needle 91 at all times other than when the nozzle 90 is within the tow at which time it is open to allow additional material, supplied to each hollow body 89 from a common source such as the reservoir 73, to flow through the nozzle 90 into the tow.

Instead of the reciprocatory applicator 68 or the rotary applicator 86 described above, a fixed applicator 93 mounted in the mouth of the first tongue piece 62 may be employed as shown in FIGURE 13.

The fixed applicator 93 comprises a hollow body 95 with a nozzle 96 directed into the first tongue piece 62. A needle is provided in the hollow body to open and close the nozzle 96. The needle is reciprocated in the body by a cam driven by means 97, shown diagrammatically in FIGURE 13, driven from a sprocket on the roller 67 so that the reciprocatory motion of the needle is a function of the linear speed of the belt 65 and hence of the tow and wrapper through the plugmaker. A conduit 98 leads from the body 95 to a pressurised source (not shown) of material to be applied to the tow. The tow, indicated by the reference numeral 99, in FIGURE 13, is in partially gathered form adjacent the nozzle 96. It is arranged that the needle moves out of the nozzle 96 for a short period to allow material to flow into the tow at, for example, 30 mm. intervals. The material spreads radially and axially through the tow as it is fully gathered into rod-like form and is enwrapped and by selecting characteristics of the material, usually a slurry, it may be arranged that substantially equal lengths of material-bearing and material-free sections of the tow appear in the gathered rod.

It will be realised that in each of the arrangements described with reference to FIGURES 10, 11, 12 and 13 the individual quantities of material injected into the tow may be controlled by appropriate selection of the pressure of the material at the nozzle of the injector, the viscosity of the material, usually a slurry or suspension, and the dimensions of the nozzle, or each nozzle, and the needle, or each needle.

In each of the three embodiments described with reference to FIGURES 10, 11, 12 and 13 the action of the cut-off of the plugmaker is synchronised with the injecting action of the applicator. The actual time (relative to the time at which material is injected into the tow) at which the cut-off makes a cutting action is in this case a function of the length of the continuous rod between the applicator and the cut-off.

FIGURE 14 shows an alternative arrangement for applying zones, in this case stripes, of additional material to a tow, in this case crimped continuous filamentary cellulose acetate tow. The tow from the bale 40 is tensioned and bloomed and banded as described with reference to FIGURES 7, 8 and 10. The banded tow is drawn between the nip of a pair of rollers 100 and 101 driven for rotation at a peripheral speed approximately equal to the linear speed of the plugmaker 3. Each roller 100 and 101 has bearing against a portion of its surface not covered by the tow a wick 102 which has a length in the direction of the axis of the roller at least equal to the width of the band of tow. The wicks are supplied through conduits 103 with a substance which causes the filaments to adhere rapidly to one another. Such a substance may be a solution of a polymeric substance in a volatile solvent, for example sodium carboxymethyl cellulose in water, or the substance may be a plasticiser such as triacetin.

The substance flows through the wicks 102 and is deposited on the rollers 100 and 101 and is carried round with the rollers 100 and 101 and is then transferred to the tow, each roller 100 and 101 applying substance to a different face of the band of tow.

The tow with the adhesion causing substance thereon is passed through a heating device 104 which causes the filaments to be adhered to one another. In this form the tow is substantially inextensible when subjected to such tensile forces as it may encounter in the subsequent process steps to be performed on it.

On leaving the heater 104 the tow passes through an applicator device 105 which is in all essential respects identical with the applicator devices 6 and 37 described with reference to FIGURES 1 and 6.

The tow with zones, in this case stripes, of additional material applied thereto passes from the device 105 through a drier 106 which drives off the suspending agent of the slurry forming the stripes to a plugmaker 3 wherein it is gathered, enwrapped and cut into multiple length multiple filters 5.

Specific examples of the method described with reference to FIGURE 14 will now be given.

EXAMPLE A

Crimped continuous filamentary cellulose acetate tow was used. The tow had a filament denier of 8 and a total denier of 60,000 before being crimped. The tow was formed into a band by passing it between the two pairs of rollers 41 and 42 and the banding device 43. The band had applied thereto a solution of 5% sodium carboxymethyl cellulose in water by means of the wicks 102 and rollers 100 and 101. The band was then heated in the heater 104 and then had applied thereto stripes of carbon slurry of 15 mm. width in the longitudinal direction of the band and were spaced apart by a distance of 15 mm. The slurry comprised 0.9% solution of carboxymethyl cellulose of low intrinsic viscosity containing 27% carbon by weight dispersed therein. The band was then dried by the drier 106, gathered into rod-like form, wrapped and cut into 90 mm. sextuple length dual filters 5.

Each sextuple length dual filter had a length of 90 mm. and a circumference of 24.9 mm. These filters 5 had a circumference of 24.9 mm. and a pressure drop of 24 cms. of water at an air flow rate through the filter of 17.5 cc. per sec.

The apparatuses and embodiments of the method of the invention described above are of course also applicable to cases where the additional material is itself a liquid.

Embodiments of the invention will now be described wherein the material may be applied to a web, tow or yarn not in admixture with a liquid. In the following embodiments the additional material may be applied in admixture with a resin.

FIGURE 15 shows an arrangement in which tow is withdrawn from a bale 40, is tensioned and bloomed, is banded and is sprayed with plasticiser. The banded tow then passes through the nip of a roller 110 and an applicator drum 111. The roller 110 is located high on the side of the drum 111 nearer the bale 40 and a further roller 112 is located against the other side of the drum 111. The drum 111 is driven for rotation with a peripheral speed equal to the linear speed of the plugmaker 3 and in a clockwise direction as seen in FIGURE 15 and hence the tow is carried round in close surface contact with the drum.

The drum 111 as may be more clearly seen in FIGURE 16 has a plurality of axially directed recesses 113 therein spaced from one another by lands 114. Mounted above and in surface contact with the drum 111 is a hopper 115 extending over the full axial length of the recesses 113. The discharge end of a vibratory feeder 116 is located over the hopper 115 and a further, vibratory, hopper 117 is mounted above the feeder 116.

A doctor blade 118 is disposed in surface contact with the drum 111 between the hopper 115 and the roller 110.

A homogeneous mixture of particulate additional material capable of having a filtering or other required effect upon tobacco smoke, in the present example activated charcoal, and a resin in more finely divided form, in the present example cellulose actate, is provided in the hopper 117. In a preferred embodiment the activated charcoal is of a particulate size to pass through an 85 mesh British standard screen and the cellulose actate particles are of a size to pass through a 200 mesh British standard screen. The mixture contains 75% by weight of charcoal and 25% by weight of cellulose acetate. From the hopper 117 the mixture falls on to the vibratory feeder 116 from the lower end of which it is discharged at a selected rate into the hopper 115. Some of the mixture in the hopper 115 fills up the recesses 113 as they pass beneath the hopper 115. The drum 111 rotates carrying with it mixture in the recesses 112. The doctor blade 118 carries away to one or both ends of the drum 111 any mixture which may be on the lands 14. As individual recesses 113 arrive adjacent the roller 110 they are covered by the band of tow and as individual recesses 113 move from the roller 110 towards the roller 112 the mixture in the recesses 113 is transferred under the influence of gravity to the tow. The transfer of mixture is complete before the tow arrives at the roller 112. After passing through the nip of the roller 112 and the drum 111 the tow is drawn towards the plugmaker 3 wherein it is gathered and enwrapped and cut into multiple length multiple filters 5. The drum 111 rotates continuously and hence recesses 113 are continuously emptying and filling. The circumferentially directed dimensions of the recesses 113 and lands 114 may be chosen in accordance with the required lengths of the material-bearing and material-free sections of the rod being continuously formed in the plugmaker, but as an example, each of the two dimensions may be 15 mm. The amount of mixture applied to the tow in each zone, in this case strips, is determined by the length of the recesses 113 which is usually equal to or slightly less than the width of the band of tow and by the depth of the recesses 113. The weight of material applied in each zone is determined by the volume of the recesses 113 and the bulk density of the mixture. As an example, 0.080 gm. quantities of the particulate mixture may be applied in each zone.

Upon being gathered in the plugmaker 3 the filaments of the tow bond to one another at randomly spaced points due to presence of plasticiser. Also by virtue of the plasticiser present the cellulose acetate particles present in the mixture of charcoal and resin bond to one another and hence bond the carbon particles in the mixture and the mixture as a whole is bonded to the filaments. The multiple length multiple filter rods 5 are allowed to harden.

It has been found that the ability of the carbon particles to adsorb constituents of tobacco smoke is substantially unimpaired by the presence of the plasticiser and of the resin bonding the particles to the filter material. It appears that the fine particles of cellulose acetate resin protect the particles of carbon from deactivation by the triacetin.

FIGURES 17 and 18 shows an alternative arrangement for applying zones of mixture to the tow.

A recessed drum 120 similar to the drum 111 is mounted beneath a hopper 121 similar to the hopper 115. The lower extremity of the drum 120 is in line contact with a further recessed drum 122, the drums 120 and 122 being of equal diameter. The drum 122 is provided with recesses 123 of larger arcuate dimensions than those of the drum 120, there being the same number of recesses 123 as there are recesses 113 in the drum 120. Each recess 123 in the drum 122 is bounded by a pair of lands 124 each of which is of very small angular extent whereby a recess 123 is formed between adjacent lands 124. In general, the arcuate extent of each recess 123 together with the lands 124 bounding it will be equal to the axial length of the zone upon which it is desired to apply additional material.

A shroud 126 extends in surface contact with the drum 120 between the hopper 121 and a line close adjacent the line of contact of the drums 120 and 122 and on the left hand side of the drum 120, that being the side of the drum 120 at which the recesses 113 therein are full when in operation. The shroud 126 serves to retain mixture in the recesses 113.

A roller 127 is provided to feed the tow against the drum close to the line of contact between the drums 120 and 122.

In operation, the recesses 113 in the drum 120 become filled upon passing beneath the hopper 121. It is arranged that mixture in the recesses 113 passes solely to the recesses 123 in the drum 122 and is thence applied to the tow in the manner described with reference to FIGURE 15.

In the embodiment described above with respect to FIGURES 15 and 16 the resin is a solvent plasticisable resin. An embodiment will now be described with reference to FIGURE 19 in which the resin used in thermoplastic, such as polyethylene.

The apparatus shown in FIGURE 19 is substituted for the plugmaker 3 in the apparatus shown in FIGURE 15 or the apparatus shown in FIGURE 15 as modified by the apparatus shown in FIGURES 17 and 18.

Continuous filamentary cellulose acetate tow is drawn from the bale 40, is tensioned and bloomed, is banded, is sprayed with plasticiser for the cellulose acetate filaments and has quantities of material applied thereto in zones. In this case the material is a homogeneous mixture of activated carbon and polyethylene both in particulate form, the particles of carbon being of a size which will pass through an 85 mesh British standard screen and the particles of polyethylene being of a size to pass through a 300 mesh British standard screen.

The tow, indicated by the reference numeral 130 in FIGURE 19, then passes through a die 131 which has a funnel-like entrance 132 to gather the tow into rod-like form. The funnel-like entrance is contiguous with a tubular passage 133 through which a porous belt 138 draws and enwraps the tow. The belt is cleaned in a cleaner 139. Steam supplied under pressure through a conduit 134 from a source (not shown) flows through a plenum chamber 135 and then through passages 136 and the belt 138 into the tow. Heat from the steam causes fusion of the polyethylene and hence bonding together of the mixture and bonding of the mixture to the tow. The filaments of the tow are bonded together at randomly spaced points by the solvent action of the plasticiser applied in the spray booth 36. The continuously formed rod issuing from the die 131 is cut into multiple length multiple filter rods by a rotary cutter 137.

If so desired the continuously formed rod issuing from the die 131 may be passed through a similar die which directs cool air into the tow in order to more rapidly cure and set both the fusion and solvation bonds. The rod upon issuing from such a further die would then be cut into the rods 5.

If so desired the continuous rod issuing from the die 131 or the above-mentioned further die may be enwrapped in a conventional plugmaker, such as the plugmaker 3. In this case it is preferable that the continuous rod issuing from the die should have a larger cross-sectional area than that required for the enwrapped rods 5. As an example the steam-treated rod may have a diameter of 15 mm. This rod would be further gathered in the plugmaker so that the enwrapped rod has a diameter of 8 mm.

It is to be understood that resins other than polyethylene and cellulose acetate may be employed. Such other resins may include polyester resins, polymethyl methacrylate and polyvinyl acetate.

It is also to be understood that paper may be used instead of filamentary tow or yarn. In the arrangement shown in FIGURE 20, a web of paper is led off a roll 1 and has applied thereto stripes of adhesive by means of a device 140 identical in construction to the applicator device 37 shown in and described with reference in FIGURE 6.

The web of paper with stripes of adhesive thereon passes to a device, identical to that shown in and described with reference to FIGURE 15 or FIGURES 17 and 18, which applies quantities of a homogeneous mixture of activated carbon and a thermoplastic resin, such as polyethylene, on top of the stripes of adhesive. The adhesive serves to adhere the particulate mixture to the paper as the paper moves away from contact with the drum 111. A radiant heater 141 is located above the paper as close to the drum 111 as is convenient. Heat from the heater 141 serves to fuse the resin and hence bond together the constituent particles of the mixture and bond the mixture to the paper. The paper with the mixture bonded thereto then passes to the plugmaker 3 wherein it is gathered, enwrapped and cut into multiple length multiple filters 5.

It is to be understood that the quantity of adhesive applied to the paper in each stripe is less than that which would be needed if the material, in the present case carbon, were not subsequently bonded to the paper by a resin. It has been found that when the carbon is adhered to the paper solely by an adhesive in the form of a glue, the amount of glue required is such that the adsorptive effort of the carbon or other material may be undesirably reduced.

FIGURE 21 shows an arrangement which may be substituted, particularly but not exclusively, for the applicator device 105 and the heater 106 in the arrangement shown in FIGURE 14. The tow is withdrawn from the bale 40, is tensioned and bloomed, is banded and has plasticiser for the material of the filaments of the tow applied thereto e.g. triacetin for cellulose acetate filaments. After being plasticised and heated to cause bonding the banded tow is drawn through the nip of a roller 145 and a drum 146 driven for rotation with a peripheral speed substantially equal to the linear speed of operation of the plugmaker 3.

The drum 146 is in the form of a hollow cylinder 147 with a plurality of axially directed slot-like apertures 148 extending through it. The apertures 148 have a length in an axial direction slightly less than the width of the band of tow, indicated by 149 in FIGURE 21. The apertures 148 may have for example a circumferentially directed dimension of 15 mm. and may be spaced apart by a distance of 15 mm. in the case where it is desired to apply stripes of 15 mm. width and spaced apart by 15 mm. on the band 149 of tow.

A conduit 150 having an exit 151 is disposed within the cylinder 147 and with its exit 151 in surface engagement with the internal surface of the cylinder 147 shown in FIGURE 21. The exit 151 is located against the internal surface of a portion of the cylinder 147 the external surface of which is covered by the band 149 of tow when the apparatus is in operation.

Also disposed within the drum may be a further conduit 152 having an exit 155 located against the internal surface of the cylinder 147 beneath the exit 151 of the conduit 150.

A suspension of particulate activated carbon in air, in some cases with the addition of cellulose acetate powder, is supplied under pressure to the conduit 150 so as to flow through the exit 151 and through the slots 148 when located opposite the exit 151. The carbon is retained on the filaments of the band of tow and the air passes through the band 149.

As the band continues to move with the drum 146 rotating in a clockwise direction as seen in FIGURE 21, the aforementioned slot and the stripe of carbon on the band 149 of tow come opposite the exit 153 of the conduit 152, if such is provided, into which steam is supplied under pressure. Steam flows through the exit 153 and the slot 148 and through the portion of the band disposed over the slot 148. The steam serves rapidly to bond together the portion of the plasticised tow and the carbon particles are retained on the tow by bonding with the surface of or enmeshing with the filaments of the tow. In the absence of steam the filaments of the plasticised tow bond together more slowly. The tow with stripes of carbon particles adhered thereto passes away from the drum to the plugmaker 3 (see FIGURE 14) wherein it is gathered, enwrapped and cut into multiple length multiple filters 5.

It has been found that in some of the embodiments described above the additional material applied in zones to the web, tow or yarn is carried off these zones into regions of the web, tow or yarn which are not intended to carry the additional material. The material may be carried off the zones by contact with portions of the plugmaker before the gathered rod is enwrapped. Reference is now made to FIGURE 22 wherein a portion of a plugmaker 160 is diagrammatically illustrated. The web, tow or yarn with zones of material applied thereto is designated 161. It will be realised that the lower surface and at least portions of the side surfaces of the web, tow or yarn are covered by wrapper material from the roll 162 when the tow enters the first tongue piece 163. However, the upper surface of the web, tow or yarn is not so protected from contact with the internal surfaces of the plugmaker and therefore the upper surface contacts portions of the internal surfaces of the plugmaker. To prevent contact of the upper surface of the web, tow or yarn with internal surfaces of the plugmaker a web of porous paper, non-woven fabric or the like is applied to the upper surface of the web, tow or yarn and moves with the web, tow or yarn and is enwrapped with the gathered rod of web, tow or yarn. The web of paper is supplied from a reel 164 and is led into the first tongue piece 163 in a required direction by means of a roller 165.

In those cases where the additional material is applied to the underside of the web, tow or yarn the feature described with reference to FIG. 22 need not be employed.

FIGURE 23 is a diagrammatic representation in axial section of a portion of a continuous rod formed in any one of the above described manners. The shaded portions 170 of the rod represent those sections of the rod carrying additional material capable of having a filtering or other required effect upon tobacco smoke and the unshaded portions 171 represent those sections of the rod free from material additional to the web, tow or yarn extending continuously throughout the length of the rod, thus the sections are unitary with one another.

The broken lines 172 indicate where cuts may be made by the cutter of the plugmaker in order to provide quadruple length dual filter rods such as the rods 5 referred to above.

The quadruple length rods are supplied to a filter tip cigarette assembly machine which cuts each quadruple length rod along the line 172 to form two dual length dual filter rods 174 which are each assembled in axial alignment with and in endwise abutting relationship with tow tobacco rods 175 and are joined to the tobacco rods 175 by a common wrapper 176 (see FIGURE 24). A final cut is made along the line 177 to form two dual filter cigarettes.

The dual filter of each cigarette comprises a rod-like section 178 adjacent the tobacco and free from additional material, a rod-like section 179 adjacent and unitary with the section 178 and carrying additional material and a rod-like section 180 at the exposed end of the filter unitary with the sections 178 and 179 and free from additional material.

It will be realised that in the above described sequence of cutting operations no cuts are made through a portion of the rod containing additional material. This is advantageous in those cases where the additional material has abrasive characteristics which tend to blunt cutting knives.

If it is desired to produce a dual filter 174 of 15 mm. length the sections 170 of the rod shown in FIGURE 23 preferably have a length of 7.5 mm. approximately and the sections 171 also preferably have a length of 7.5 mm. approximately. It will be realised that the sections 178 and 180 each have a length equal to half that of a section 171 and the length of the section 179 is equal to the length of a section 170.

In those cases where cutting through the sections 170 is not found to be undesirable the following sequence of cuts may be performed. The cutter of the plugmaker cuts through the rod (see FIGURE 23) along the lines 181 to form sextuple length dual filter rods 5. These rods are supplied to a filter cigarette assembler which makes two further cuts along the lines 182 to form three dual length dual filters which may be assembled between pairs of tobacco rods 183 as described above with reference to FIGURE 24 (see FIGURE 25). A final cut is made along the line 184 (FIGURE 25) to form two dual filter dual cigarettes. Each dual filter comprises a rod-like section 185 adjacent the tobacco rod 183 and carrying additional material and a rod-like section 186 at the exposed end of the filter and free from additional material.

If it is desired to manufacture dual filters of 15 mm. length and using the immediately above described cutting sequence the sections 170 of the rod shown in FIGURE 23 have a length of 15 mm. and the sections 171 have a length also of 15 mm. approximately.

Thus, to produce a dual filter as shown in FIGURE 24 and of 15 mm. in length, the zones applied to the web tow or yarn have a dimension of 7.5 mm. and are spaced apart by a distance of 7.5 mm. in the direction of movement of the web, tow or yarn towards and through the plugmaker. Likewise to produce a dual filter as shown in FIGURE 25 the immediately above described dimensions are each respectively 15 mm.

The method of the present invention has been described above in embodiments together with apparatus for the manufacture of dual filters. It is to be understood that the method is also applicable to the manufacture of triple and higher multiple filters. Such triple and higher multiple filters may be formed by the successive application to a web, tow or yarn of different additional materials capable of providing a required filtering or other effect upon tobacco smoke. The several materials are in this case applied in zones, usually stripes, having a predetermined spacial relationship with one another on the web, tow or yarn.

It is also to be understood that the portions of a web, tow or yarn and hence the sections of the gathered rod which have been described above as being free from additional material may also have applied thereto a material capable of having a filtering or other required effect upon tobacco smoke.

Whilst in many of the embodiments described above activated carbon has been described as the material capable of providing a filtering or other required effect upon tobacco smoke, it is to be understood that carbon has been given solely as an example and that other materials such as liquid polyethylene glycol, sepiolite and fuller's earth may constitute the additional material.

In some cases it is desirable to form a multiple filter having three or more rod-like sections formed from two separate filter rods in axial alignment, at least one of which rods has two rod-like sections unitary with one another and providing different filtering or other effects upon tobacco smoke.

It may be desirable to make such a multiple filter because, for example, it is found convenient to apply additional material or materials to a first type of web, tow or yarn which has undesirable characteristics when located at the exposed end of the filter. Such undesirable characteristics may be, for example, texture, absorbancy, appearance or the like.

FIGURE 26 shows a portion of a first continuous dual filter rod made by the method of the present invention. The rod comprises alternate sections 244 and 243 carrying additional materials A and B respectively.

FIGURE 27 shows a portion of a second continuous dual filter rod made by the method of the present invention. The rod comprises alternate sections 246 and 245 carrying additional materials C and D respectively.

The rod shown in FIG. 26 is cut through along the lines 240 to form a plurality of rods each having a section at each end carrying additional material A and a middle section carrying additional material B.

The rod shown in FIG. 27 is cut through along lines 241 to form a plurality of rods each having a section at each end carrying additional material C and a middle section carrying additional material D.

The rods cut from the continuous rods shown in FIGS. 26 and 27 are arranged alternatively on a continuous rod dual plug machine of known form and are enwrapped together to form a continuous rod a portion of which is shown in FIG. 28.

The continuous rod shown in FIG. 28 is cut through along lines 242 to form quadruple length quadruple filter rods which are supplied to a filter tip cigarette assembling machine which makes a cut along the line 247 through each quadruple length quadruple filter rod to form two dual length quadruple filter rods. Each dual length quadruple filter rod is assembled in axial alignment and endwise abutting relationships with two tobacco rods 222 and 223 as shown in FIG. 29.

The dual length quadruple filter is joined to the tobacco rods 222 and 223 by a wrapper 224 and a final cut is made on the assembling machine and along the line 225 to form two quadruple filter cigarettes.

As may be seen in FIG. 29 each quadruple filter cigarette comprises a tobacco rod 222 or 223 with a first rod-like body 226 adjacent one end thereof and a second rod-like body 235 disposed at the end of the rod-like body 226 remote from the tobacco rod 222 or 223.

The body 226 has an interface 231 with the tobacco rod and an interface 229 with the body 235.

The quadruple filter comprises in succession in the direction extending away from the tobacco rod a section carrying material D and a section carrying material C, both in the body 226, a section carrying material B and a section carrying material A, both in the body 235.

Whilst it is stated with reference to FIGS. 26 to 29 that four additional materials A, B, C and D are carried in the quadruple filter it will be realised that one or the other of the materials may be omitted, as for example material A, or both the materials A and B could be omitted from the rod shown in FIG. 26.

An advantage afforded by the methods and products described with reference to FIGURES 26 to 29 resides in the ability to form triple or higher multiple filters carrying materials which may be incompatible with one another when in the form in which they are applied to the web, tow or yarn or which may require different conditions of temperature, moisture and the like for their successful application to the web, tow or yarn.

As a specific example of a triple filter in accordance with the above procedures described with reference to FIGS. 26 to 29 may be quoted the following example.

The rod-like body shown in FIGURE 27 is formed of continuously embossed paper and the sections 245 carry material D in the form of alkaline materials to remove acidic constituents of tobacco smoke and the sections 246 carry material C in the form of particles of charcoal to remove vapour phase constituents of tobacco smoke. The continuous rod shown in FIGURE 26 is formed of filamentary cellulose acetate filter material. Thus, a triple filter cigarette produced as described above with reference to FIGURES 26 to 29 comprises a tobacco rod 222 or 223 with a triple filter attached thereto and comprising a first body 226 formed of continuously embossed paper and having a first section carrying the alkaline materials and a second section 212 carrying charcoal particles and a second body 235 formed of filamentary cellulose acetate filter material not carrying additional materials and so located as to be at the free end of the filter.

If the alkaline materials and the charcoal particles are at all times compatible the alkaline materials may extend over the full length of the body 226, that is throughout the length of the continuous body shown in FIGURE 27, and charcoal particles may be carried on top of the alkaline materials in spaced apart sections such as sections 246.

It will be realised that in the production of multiple filters as described above it is not necessary to endeavour to cut a multiple length multiple filter through one of the interfaces existing in the multiple length multiple filter between adjacent rod-like bodies therein and hence the difficulty of avoiding bad register, which could result in rod-like bodies of small axial length which could fall out of the filter, is not encountered.

What is claimed is:
1. A method of manufacturing integral multiple tobacco smoke filters comprising the steps of:
(a) providing a web of filter material selected from the group consisting of paper, bulked yarn and filamentary tow, said web having an elongated axis and being continuous in the direction of said axis;
(b) continuously feeding said web in the direction of said axis;
(c) applying an additional material capable of modifying smoke, to separated zones of said web during the feeding of said web to define spaced first sections having said additional material applied thereto and second sections extending between successive first sections devoid of said additional material;

(d) gathering said web bearing said additional material into an axially elongated rod with said first sections being spaced along the axis of said rod and during said gathering disposing portions of said web throughout all transverse cross-sections of said rod and along the full length of said rod and defining a tortuous path axially of said rod by said web and said additional material; and (e) transversely cutting said rod in lengths each having at least a portion of one first section and at least a portion of one second section.

2. The method defined in claim 1 further including the step of applying at least one further additional material capable of modifying smoke, to at least portions of said second sections prior to gathering said web into said rod.

3. The method defined in claim 1 including the steps of forming a suspension of said additional material in a liquid suspending agent, applying said suspension of additional material to said separated zones of said web and drying said web.

4. The method defined in claim 1 including the steps of forming a mixture of said additional material in particulate form and a resin in particulate form and applying said mixture of additional material and resin to said separated zones of said web and bonding said additional material to said web with said resin.

5. The method defined in claim 4 wherein said resin is thermoplastic and including the step of heating said web after application of said mixture of additional material and resin to said separated zones, to fuse said resin.

6. The method defined in claim 1 including the steps of entraining said additional material in a gaseous stream and passing said gaseous stream with said additional material entrained therein through separated zones of said web to apply said additional material to said web.

7. The method defined in claim 6 including the steps of forming a mixture of said additional material in particulate form and a resin in particulate form and entraining said mixture in said gaseous stream, passing said gaseous stream with said mixture entrained therein through said separated zones of said web, and passing stream through said web to fuse said resin and bond said additional material to said web.

8. The method defined in claim 1 wherein said web is a filamentary tow and is subject to dimensional change in its axial direction and including the step of preventing dimensional change in said tow in its axial direction at least from the point of application of said additional material until said tow bearing said additional material is gathered into said rod.

9. The method defined in claim 8 including the steps of preventing dimensional change in said tow in its axial direction by providing a plurality of substantially inextensible filaments, and bonding said inextensible filaments at least to axially spaced portions of said tow prior to applying said additional material to said separated zones of said tow.

10. The method defined in claim 8 including the step of preventing dimensional change in said tow in its axial direction by applying an adhesion-causing substance to said tow to adhere the filaments of said tow to each other at least at axially spaced portions of said tow.

11. An apparatus for manufacturing integral multiple tobacco smoke filters comprising:

(a) means defining a source of a web of filter material selected from the group consisting of paper, bulked yarn and filamentary tow, said web having an elongated axis and being continuous in the direction of said axis;

(b) means for continuously feeding said web in the direction of said axis;

(c) means for applying an additional material capable of modifying smoke to separated zones of said web during the feeding of said web to define spaced first sections having said additional material applied thereto and second sections extending between successive first sections devoid of said additional material;

(d) means for gathering said web bearing said additional material into an axially elongated rod with said first sections being spaced along the axis of said rod and during said gathering disposing portions of said web throughout all transverse cross-sections of said rod and along the full length of said rod and defining a tortuous path axially of said rod by said web and said additional material; and (e) means for transversely cutting said rod in lengths each having at least a portion of one first section and at least a portion of one second section.

References Cited

UNITED STATES PATENTS

| 3,120,690 | 2/1964  | Stevens     | 156—166 X |
| 3,128,680 | 4/1964  | Schaaf      | 91—1      |
| 3,043,736 | 7/1962  | Touey       | 156—152   |
| 2,915,069 | 12/1959 | Schur       | 131—267   |
| 3,094,450 | 6/1963  | Davidson    | 156—209   |
| 3,205,107 | 9/1965  | Gallagher   | 156—180   |
| 2,219,491 | 10/1940 | Podmore     | 131—61    |
| 2,543,277 | 2/1951  | Copeman     | 131—61    |
| 2,682,270 | 6/1954  | Schur       | 131—61    |
| 2,866,465 | 12/1958 | Bunzl et al.| 131—61 X  |
| 3,259,029 | 7/1966  | Hall et al. | 131—94 X  |

FOREIGN PATENTS

| 697,648   | 9/1953 | Great Britain. |
| 1,109,587 | 9/1955 | France.        |

EARL M. BERGERT, *Primary Examiner.*

SAMUEL KOREN, *Examiner.*

P. DIER, *Assistant Examiner.*